United States Patent [19]
Dragt

[11] Patent Number: 5,846,129
[45] Date of Patent: Dec. 8, 1998

[54] APPARATUS AND METHOD FOR SEPARATING PRODUCE FROM THEIR VINES

[76] Inventor: Steve Dragt, 6404 Cochran Dr., Bakersfield, Calif. 93309

[21] Appl. No.: 788,129

[22] Filed: Jan. 23, 1997

[51] Int. Cl.[6] ................................................ A01F 11/08
[52] U.S. Cl. ........................ 460/144; 460/114; 460/133
[58] Field of Search ................................ 460/144, 8, 9, 460/113, 114, 119, 133, 147, 148, 149, 150, 901

[56] References Cited

U.S. PATENT DOCUMENTS

| | | |
|---|---|---|
| 3,921,723 | 11/1975 | Seem . |
| 4,174,755 | 11/1979 | Siri . |
| 4,175,621 | 11/1979 | Seem . |
| 4,232,506 | 11/1980 | Studer . |
| 4,262,750 | 4/1981 | Merkley et al. . |
| 4,335,570 | 6/1982 | Fitzmaurice . |
| 4,915,671 | 4/1990 | Johnson . |
| 4,927,440 | 5/1990 | Butler et al. . |
| 5,099,636 | 3/1992 | Yoder . |
| 5,197,269 | 3/1993 | Meester . |
| 5,316,519 | 5/1994 | Johnson . |
| 5,480,353 | 1/1996 | Garza, Jr. . |
| 5,702,301 | 12/1997 | Meester ..................................... 460/144 |

FOREIGN PATENT DOCUMENTS 414245  8/1934  Australia ................................ 460/144

Primary Examiner—Terry Lee Melius
Attorney, Agent, or Firm—Flehr Hohbach Test Albritton & Herbert

[57] ABSTRACT

An apparatus for separating produce from a produce vine comprising: a frame (28); a substantially cylindrical shaker brush assembly (21) mounted to the frame for rotation about an axis of rotation (32), the shaker brush assembly having a plurality of spaced-apart tines (27) extending radially outwardly from the axis of rotation and terminating in free ends (31), the shaker brush assembly further being formed for vibration of the free ends of the tines as the shaker brush assembly rotates; a conveyor assembly (22) mounted for movement to the frame in a direction of rotation of the shaker brush assembly along a substantially arcuate path (37) substantially concentric to the axis of rotation of the shaker brush assembly at a radial distance therefrom positioning the free ends of the tines in close proximity to the conveyor assembly along the arcuate path; and a drive assembly (43) coupled to drive the conveyor assembly in the direction of movement.

31 Claims, 11 Drawing Sheets

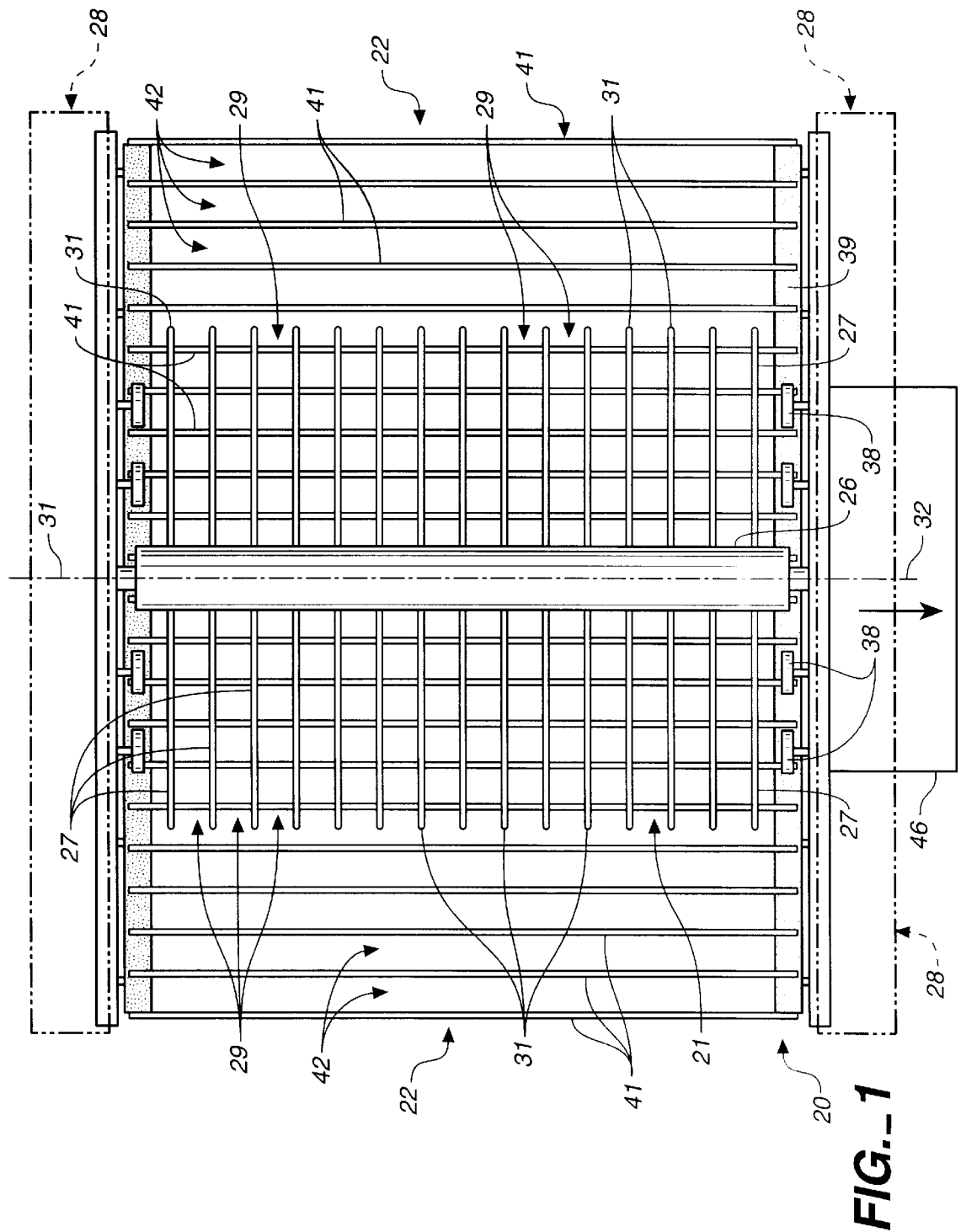
FIG._1

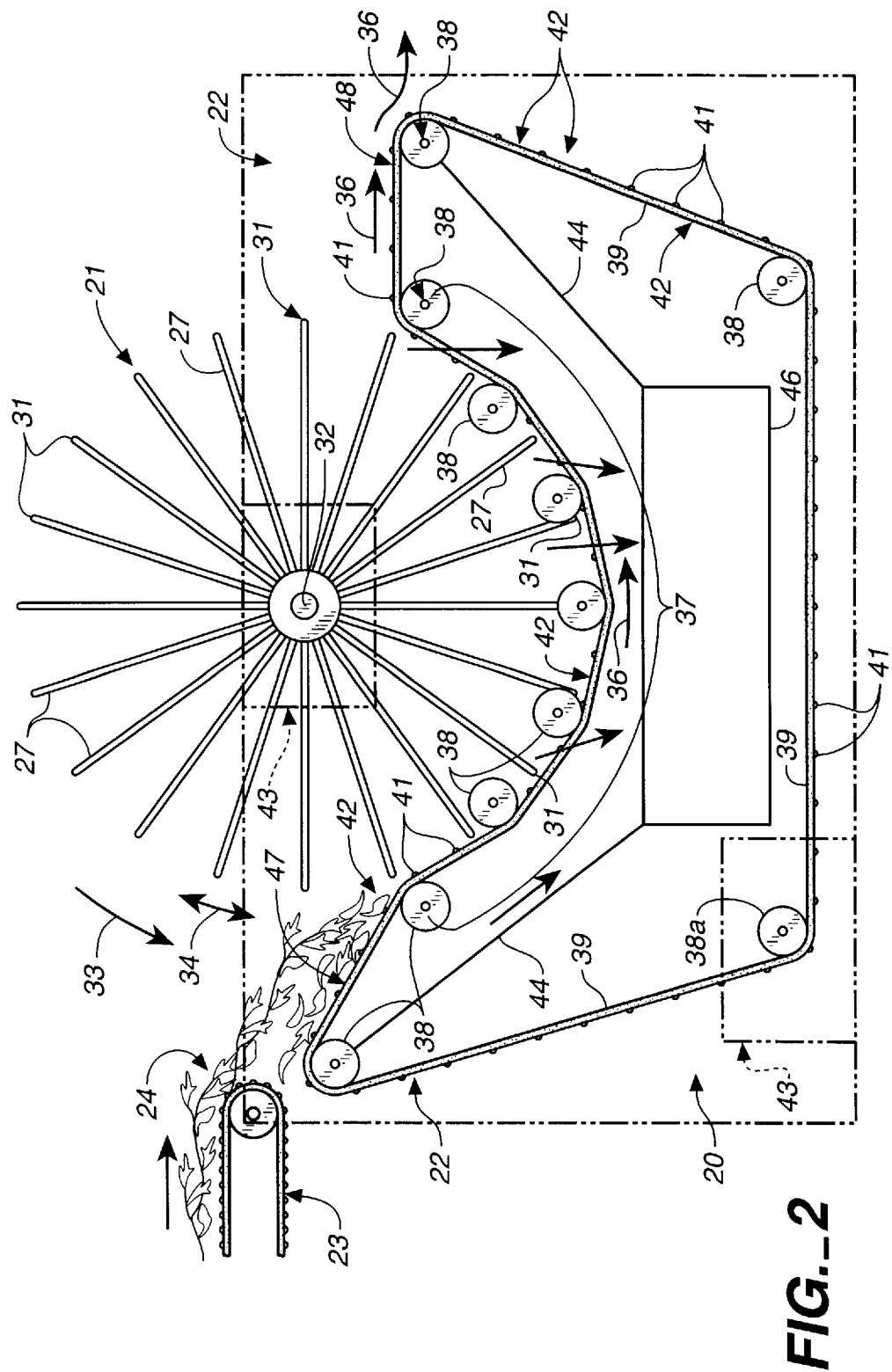
FIG._2

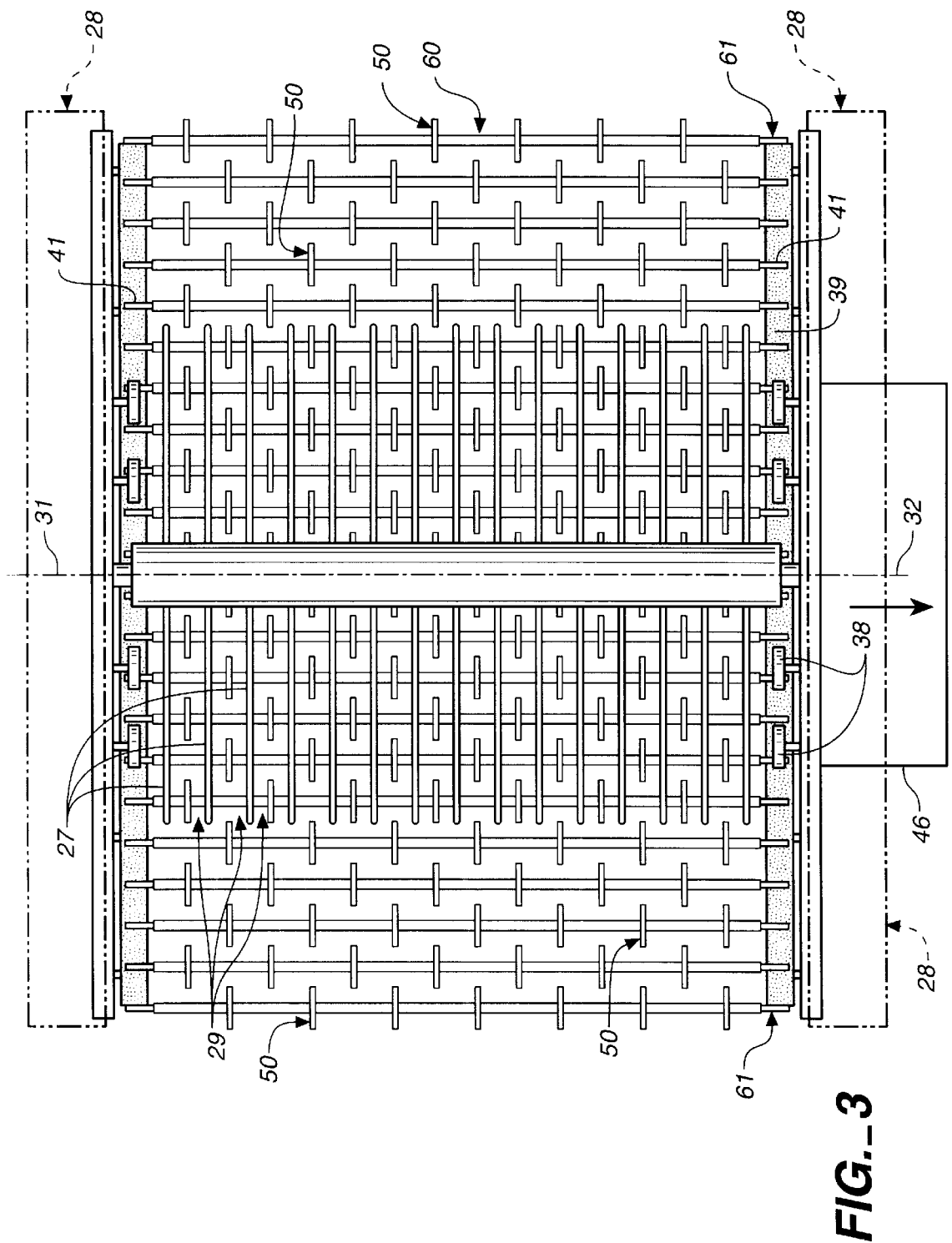
FIG._3

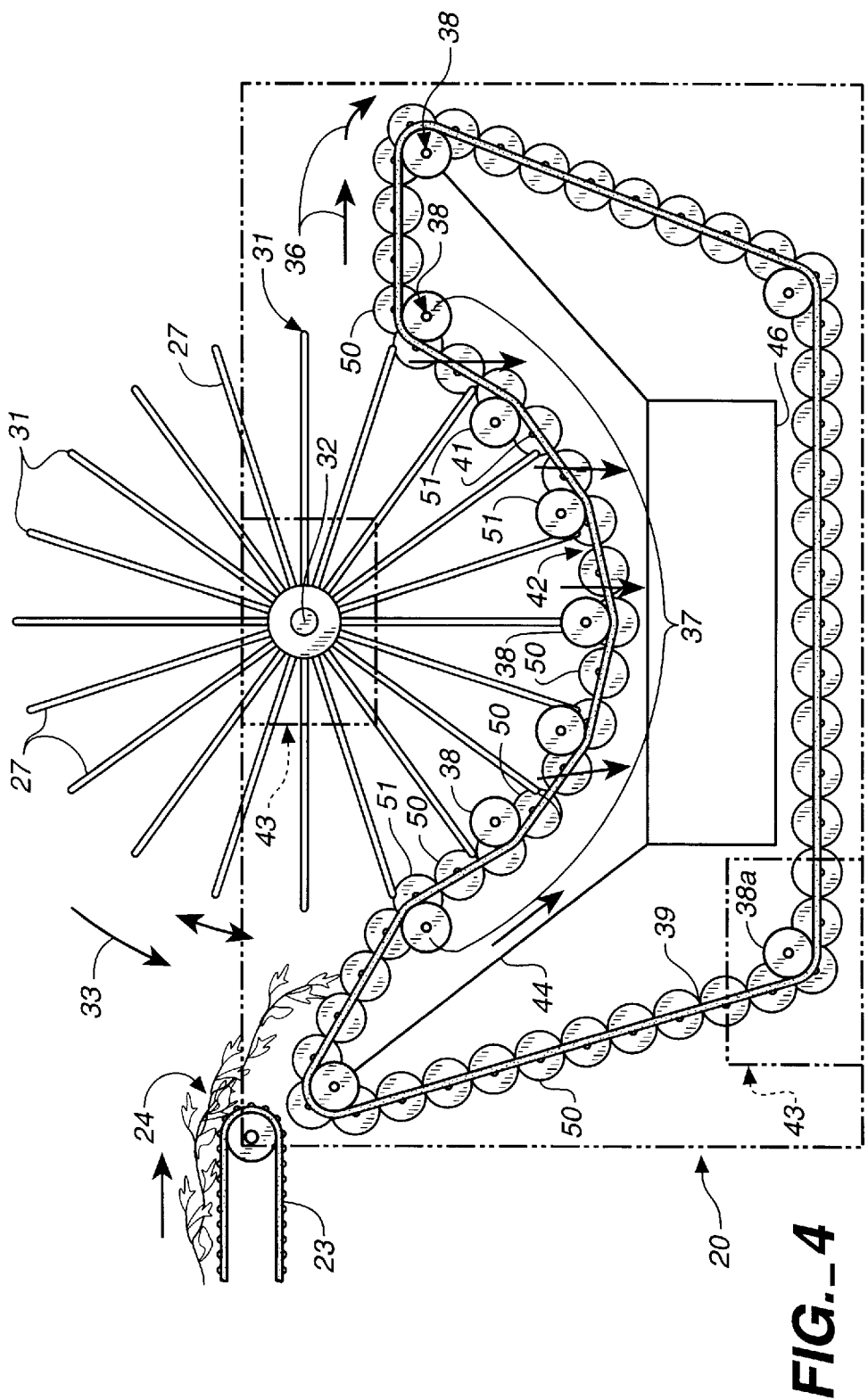
FIG._4

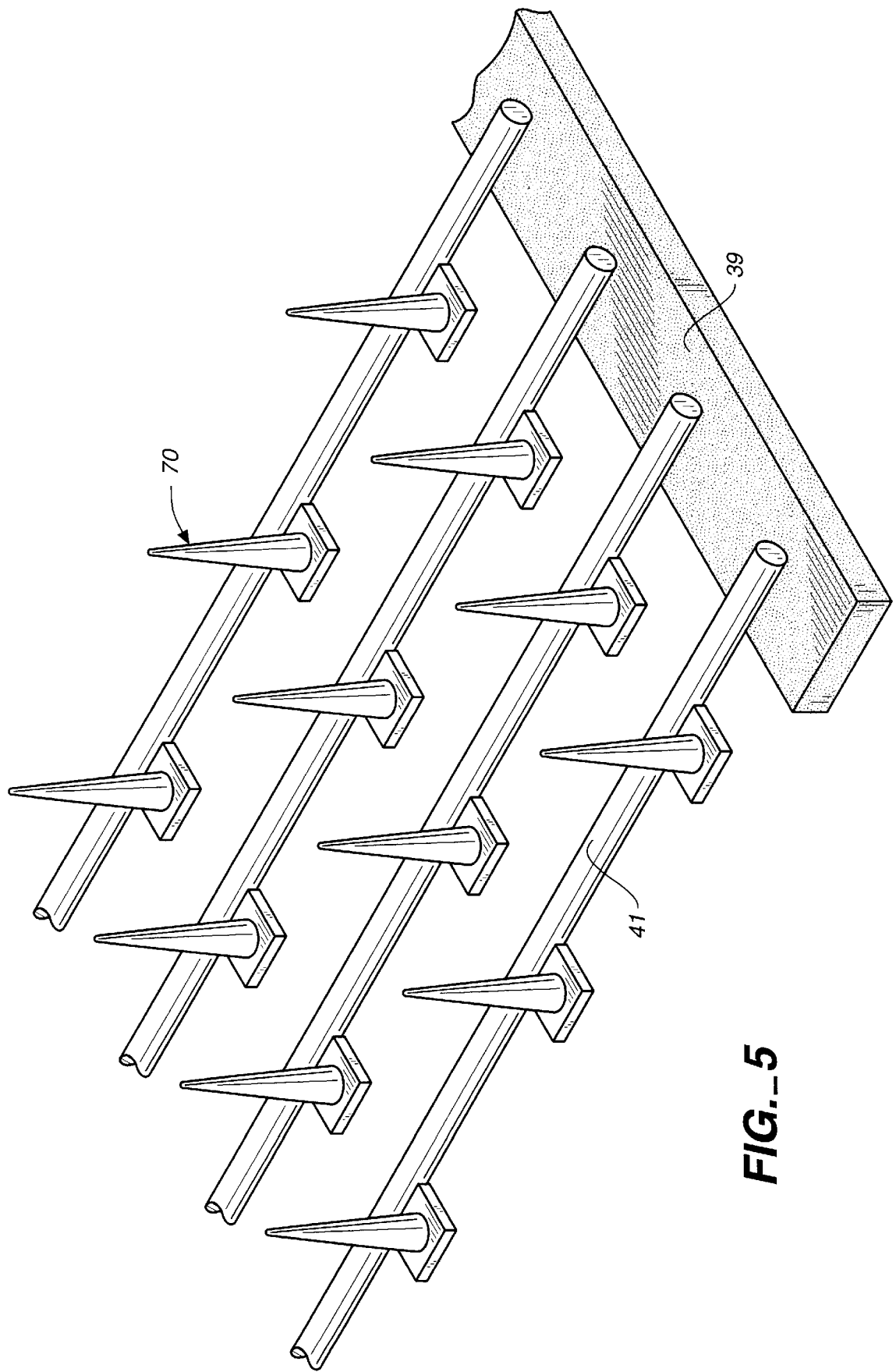
FIG._5

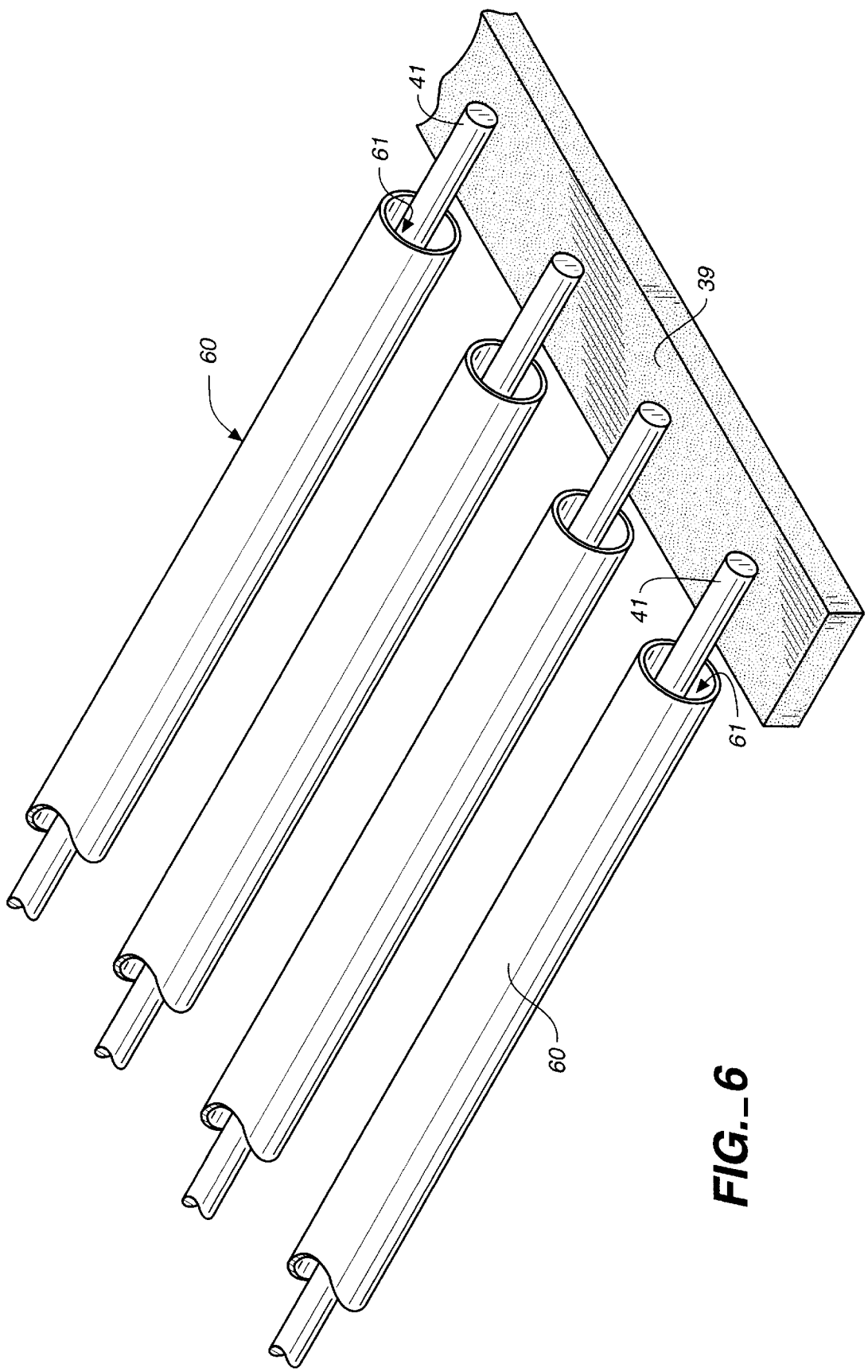

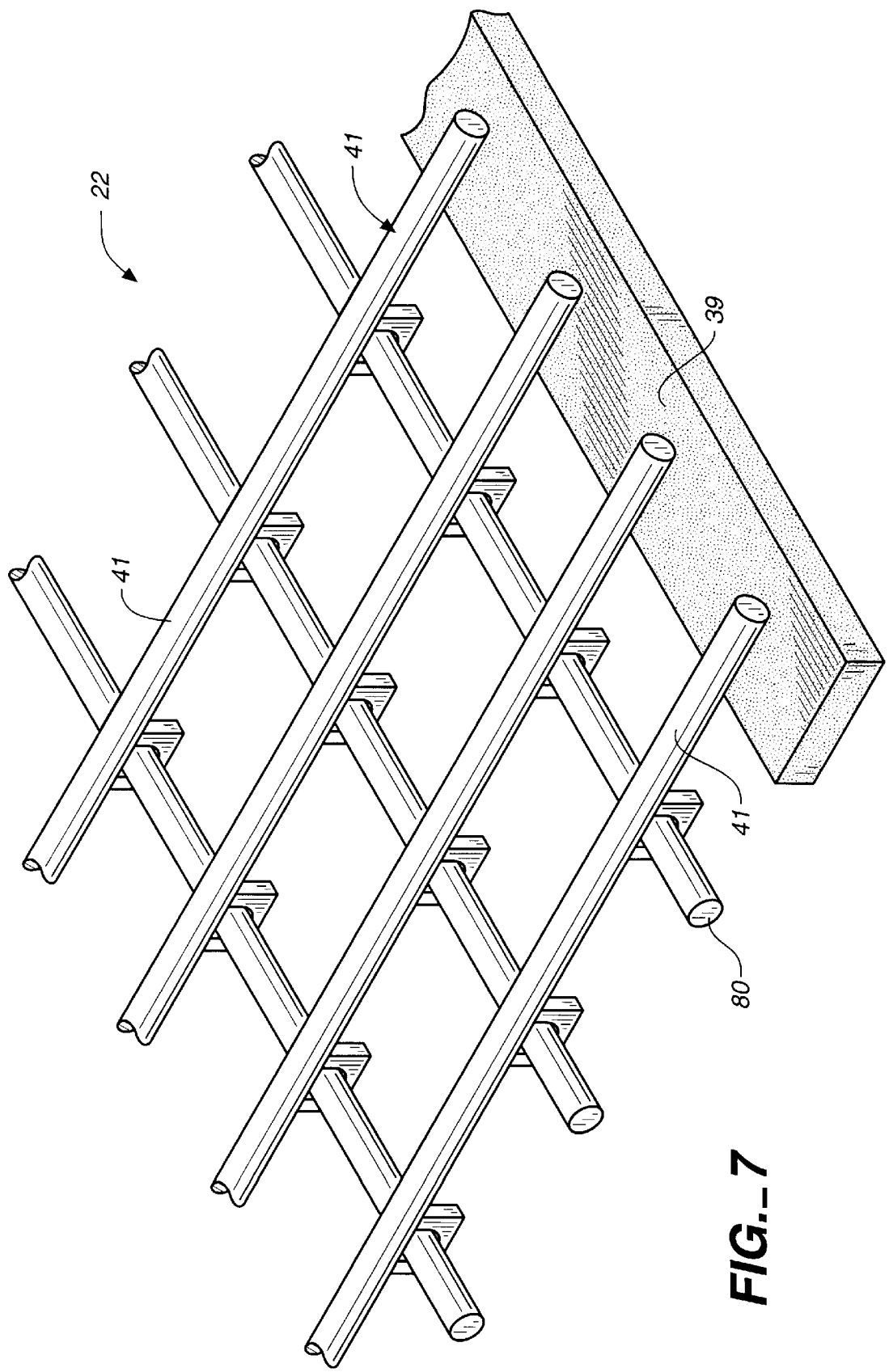
FIG._7

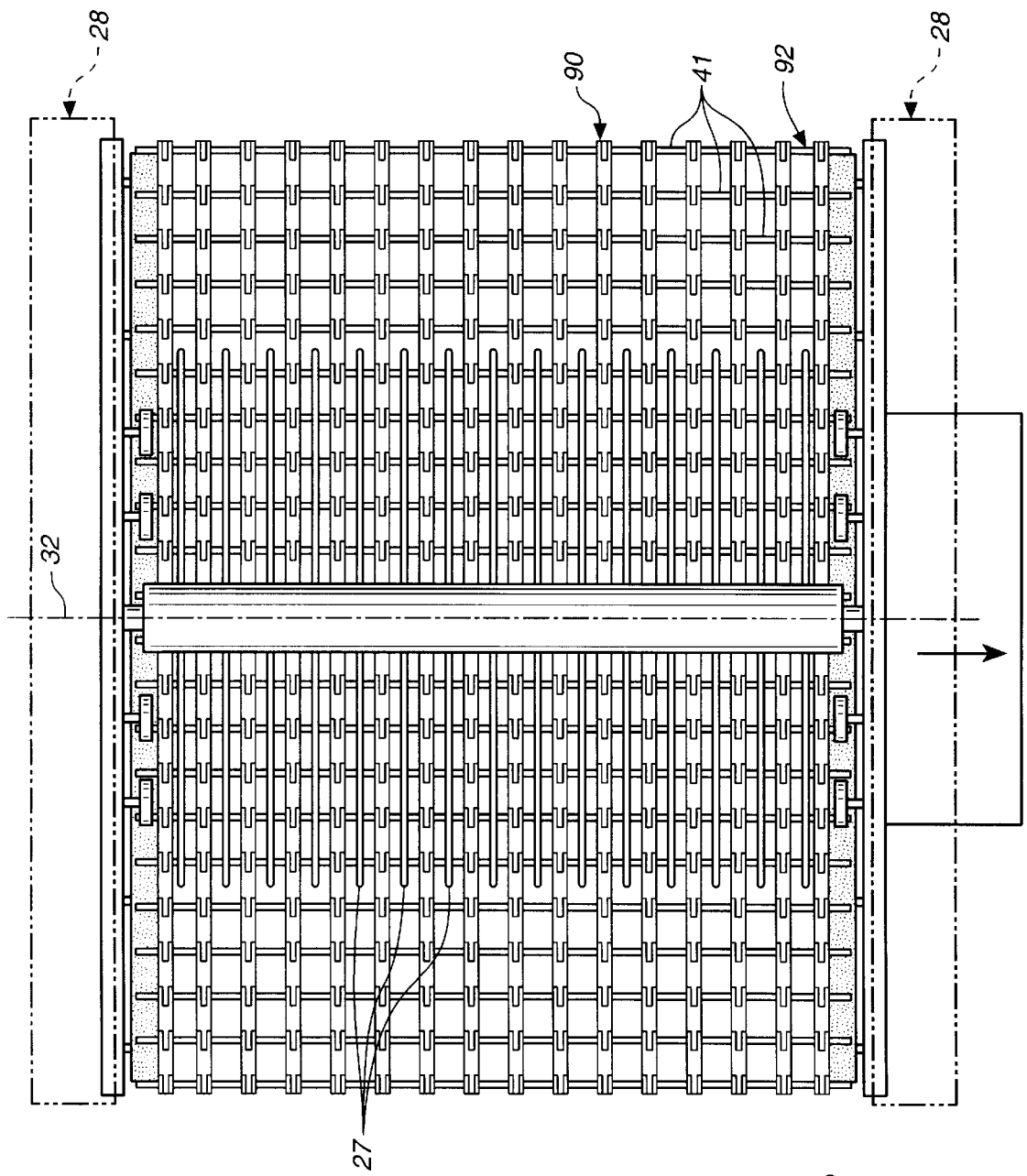
FIG._8

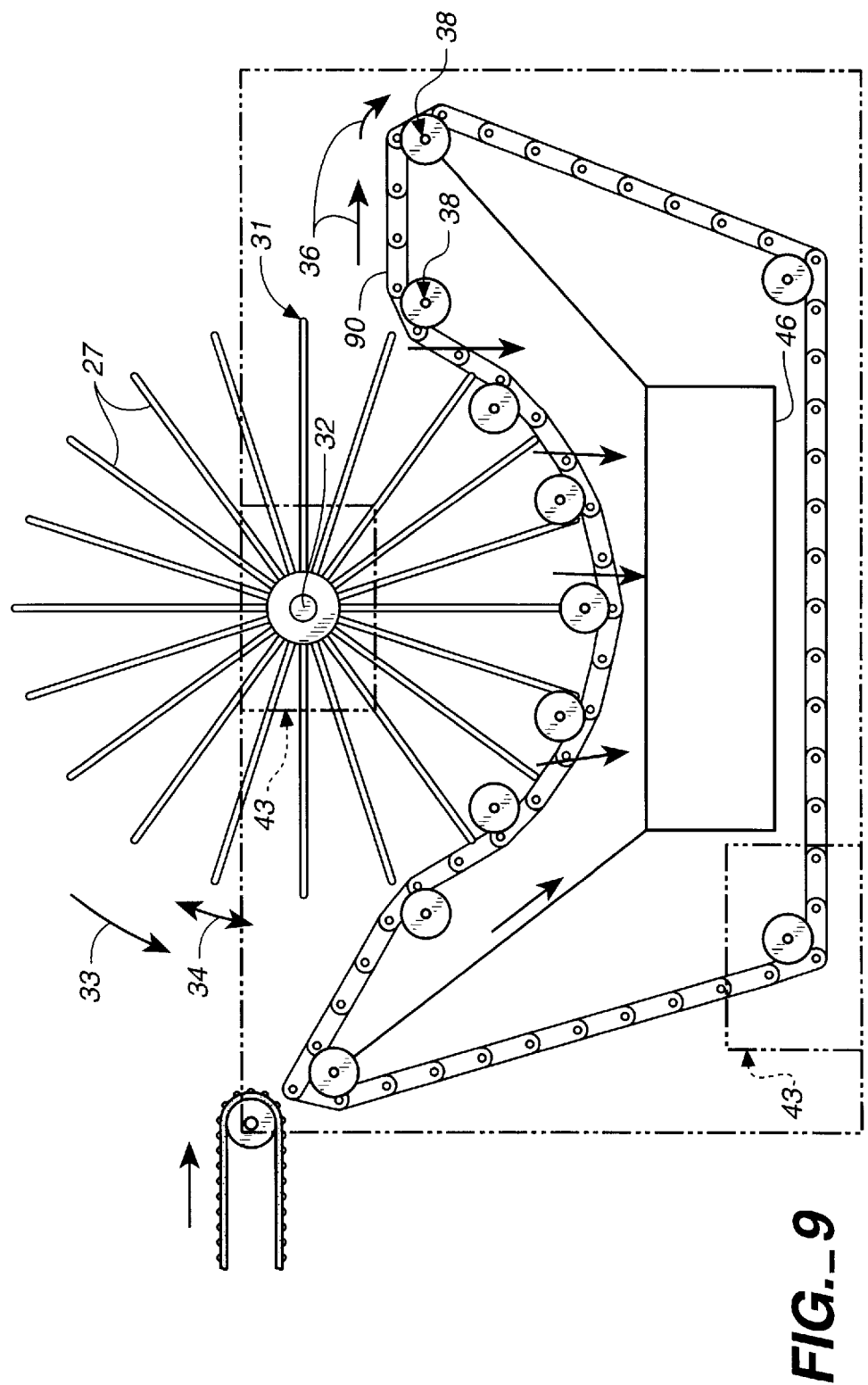
FIG._9

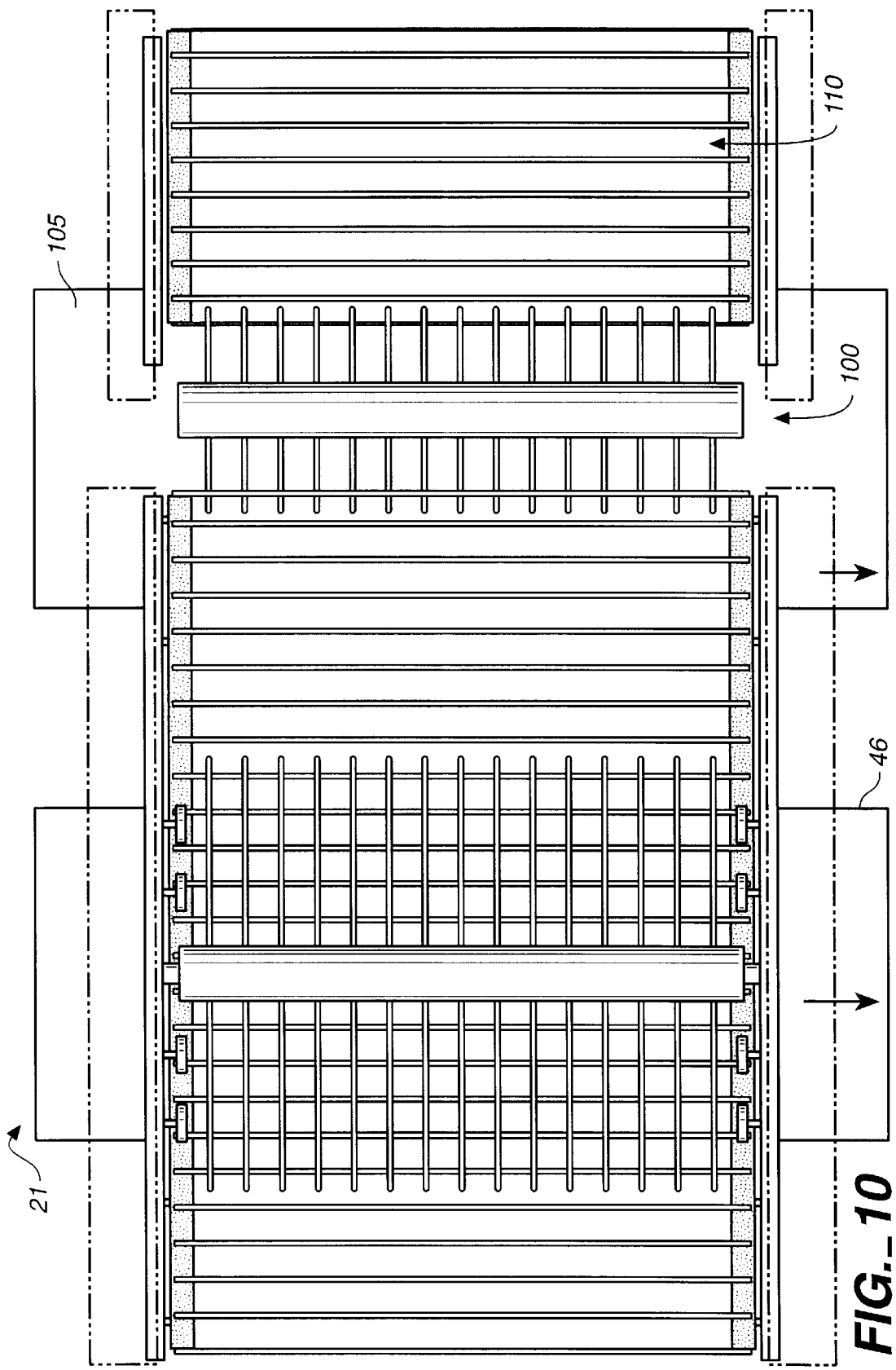
FIG._10

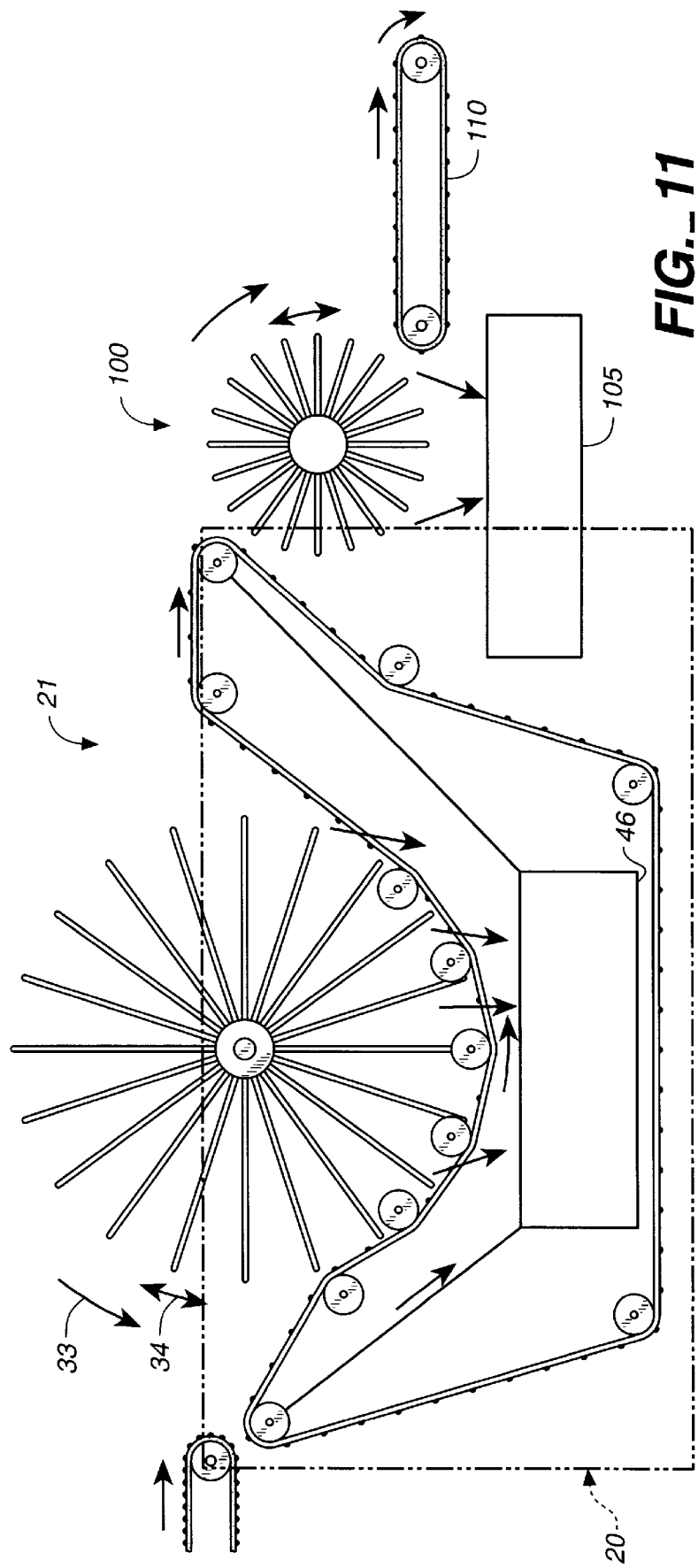
FIG._11

APPARATUS AND METHOD FOR SEPARATING PRODUCE FROM THEIR VINES

TECHNICAL FIELD

This invention relates to produce harvesting machinery which separates vegetables and fruits from their respective vines, and more particularly, relates to improvements in rotating brush produce separators suitable for use in harvesting tomatoes, peppers, cucumbers and similar vine-grown produce.

BACKGROUND ART

Systems for removing various vegetables such as tomatoes and peppers, from their vines by the use of machines which shake, agitate or oscillate the produce so as to break the vegetables free from their attached vines are well known. Such harvesting systems typically employ the basic principle of shaking the vine while the vine is moving along a conveyor. The conveyor usually has spaced openings of such a size that when the vegetables or fruit are shaken free from the vine, they fall through the conveyor openings and are collected below. The long stringy vines typically associated with this type of produce are of a size such that they do not fall through the conveyor openings and therefore remain supported on the conveyor even after the produce has been shaken free. The vines are then removed from the harvester by the conveyor for subsequent disposal, typically being simply discharged out the back of the field harvesting machine.

A first group of known produce separators exists which has the characteristic of employing a flat agitating or oscillating conveyor belt upon which vines move as their produce is shaken free. The loose produce fall through gaps in the conveyor and is collected below. Examples of such systems are found in U.S. Pat. Nos. 3,921,723 to Seem, 4,174,755 to Siri; 4,175,621 to Seem; and 4,262,750 to Merkley, et al. In conveyors of this type, the shaking motion of the conveyor alone is typically insufficient to separate a high enough portion of the produce from its attached vines. A second major problem that occurs with these systems is that when large amounts of vines are placed upon them, the vines often tend to bunch up or become so thick that produce shaken free from the vines is prevented from falling through the openings in the conveyor for collection below.

The Siri '755 and Seem '621 systems have the added feature of an agitator assembly mounted respectively under and over the oscillating conveyor structure. These agitator assemblies assist in separating the produce from its vines by lifting the vine masses from the conveyor at a number of locations or by shaking the vines. Unfortunately, these types of decompacting agitators do not operate to truly pull the vines apart to a sufficient degree. The vines become overly bunched up or entangled when passing through such systems. This entanglement and bunching together of vines prevents produce from freely falling through the openings in the conveyor for collection below.

In addition to the above discussed major limitations of this first group of prior art agitating vine separators, all of the shaking conveyors also suffer from the disadvantage that severe strains are imposed on the conveyor belt mechanism, which strains lead to frequent breakage and consequent downtime of the harvester. These conveyors also tend to suffer from frequent break-down problems caused by mud, weeds and/or rocks which require considerable cleaning and therefore excessive downtime.

A second group of known produce harvesting machines uses a rotating shaker brush with radially extending flexible tines. These rotating shaker brushes are preferably designed to oscillate somewhat as they rotate. Thus, the rotating brush tines also vibrate back and forth under an eccentric weight drive to assist in separating the produce from its vines. The specific advantage of having such a rotating and oscillating shaker brush is that it is more effective in spreading the vines apart to a degree that produce shaken loose from the vine is more freely able to pass through the gaps in the vine matrix and thereafter through the conveyor to be collected. This second group of harvesting machinery can be divided into two specific families of harvesting devices. The first family of rotating brush machines passes produce vines over the top of the rotating shaker brush, and the second family of rotating brush machines passes the vines underneath of the rotating shaker brush.

Examples of systems from this first family, or over the top rotary brush systems, are found in U.S. Pat. Nos. 4,927,440 to Butler, et al; and 5,099,636 to Yoder. In both of these designs, the rotating shaker brush is powered in its rotation. The greatest disadvantage of these over the top shakers is that they tend to shake the produce near to the centerline of the shaker brush, or at the base of the brush tines, where the amplitude of the shake imparted to the vines is less than it would be at the tips of the brush tines. In addition, overhead pass harvesting systems have the common disadvantage that produce is dropped from an undesirable height during the separation process. This fall can severely damage sensitive crops, such as tomatoes. Moreover, costly blowers and auxiliary shaker brushes often have to be employed.

The second family has the feature in common of having the produce and vines pass underneath a rotating and oscillating shaker brush. Examples of such systems can be seen in U.S. Pat. Nos. 4,335,570 to Fitzmaurice; 4,915,671 to Johnson; 5,197,269 to Meester; 5,316,519 to Johnson; 5,480,353 to Garza, Jr.; and 5,573,459 to Meester.

Several of the machines in this group use a conveyor passing under a rotating shaker brush, where the rotating shaker brush is not powered in rotation. These machines instead rely on the presence of the vines themselves to provide an interaction between the conveyor and the tines of the harvesting unit, which consequently propels the harvesting brush in rotation. Examples of this type of harvesting machine are found in the Fitzmaurice and Garza '353 systems.

The first problem with both these designs are that the spatial arrangement between the shaker brush and the supporting conveyor tends to undesirably limit the length of time that actual contact between the vine and the shaker brush occurs. This reduces the amount of produce which can be separated from the vine by the action of the shaker tines. This limitation occurs simply because the tines of the cylindrical shaker brush are in very close proximity to the planar conveyor only at one location, namely, directly below the shaker brush. Accordingly, there is little opportunity for extended contact between the tines and the vines as the vines travel along the path of the conveyor. No real extended opportunity exists for the tines to deeply penetrate, vibrate and separate the vine mass from the produce.

In the case of harvesting rotary shakers that are not powered in rotation, if the vine mass is not proportionally very heavy or substantial, or if individual vines tend not to be well connected to adjacent vines, as is typically the case with peppers, the matrix of vines so formed may be insufficient to properly rotate these non-powered rotary harvesting brushes, thus causing bunching up of the vine. on the other hand, if the vine mass is very heavy and substantial, such as when the vines, stems or branches are turgid, such as a heavy crop of tomatoes and pickles, the separated produce can become so entangled or trapped in these vines that it is not able to freely fall through for collection below.

Other machines in this second group power their shaker brushes in rotation. Examples of this type of system are found in the above Johnson '671, Meester '269, Johnson '519 and Meester '459 designs. The powering of this rotating brush operates to pull the plant vine through the harvester, thus complimenting the action of the conveyor belt. The Johnson '671 patent, however, is directed specifically to thrashing seed crop, such as wheat, barley, rice, corn and beans, and is not adapted to separate produce from vines.

The Meester '269 invention suffers from the above discussed limitation of minimal contact time for penetration and shaking of the vine matrix by the tines of the shaker brush since the tines of the cylindrical shaker brush are proximate the flat conveyor only at one location, directly under the shaker brush. The Meester '459 invention allows for more contact time between the vine matrix and the tines of the shaker brush than was available in the Meester '269 system, since the Meester '459 system twice passes the same vine matrix through the same shaker brush. However, as was true with the Meester '269 system, the Meester '459 system's tines of the cylindrical shaker brush are proximate the flat conveyor at only one location, being directly under the shaker brush.

A final category of harvesting shaker is found in U.S. Pat. No. 4,232,506 to Studer which discloses a rotary shaking brush with radially-outwardly projecting rods and arcuate guide rods positioned around the drum. In this design, the vines are shaken by subjecting them to angular acceleration and deceleration while they are transported around an arcuate path. The specific disadvantage of this system is that when harvesting a crop with a stiff vine, such as peppers, the vine tends to bunch up between the vibrating tines of the brush as the brush rotates and pushes the vine mass along a non-moving arcuate rod. Accordingly, this vine mass tends to be held against the front side of each tine since this arcuate rod resists its forward motion. An additional important disadvantage common to all the above produce separator systems is that the moving conveyor in these systems do not have the ability to provide resistance to movement of the vine masses relative to the conveyors. Thus, the vines slide relative to the conveyors when engaged by shaker brushes, and the separating action imparted to the vines is reduced as the vines merely tend to ride the tines of the rotating shaking brush.

Lastly, all of the present harvesting shaker brush systems are not well designed to cope with the problem of crops having hooked stems, which become entangled on the system conveyor. Similarly, the problem of small and brittle vines falling through the openings in the conveyor system when the produce is not addressed.

OBJECTS OF THE INVENTION

Consequently, it is an object of the present invention to provide a vine separating harvesting machine which is able to more efficiently separate and successfully remove produce from its attached vines such that a greater yield of produce can be removed and collected than has been seen in the prior art.

Another object of the present invention is to provide a vine separating harvesting machine which is able to more efficiently separate and successfully remove produce from its attached vines such that a greater variety of different types of produce can be removed and collected than has been seen in the prior art.

Another object of the present invention is to provide a method and apparatus for harvesting produce which eliminates excessive bunching together of the vines as they pass through the system and specifically should be enabled to spread the vines apart such that produce can be shaken free of the vines and is able to fall freely through the vine matrix and conveyor for collection.

Still another object of the present invention is to provide a rotary brush harvester and method which provides longer engagement between the vine and the tines of the harvesting brush to ensure a greater shaking action of the vine thus freeing more produce from the vine.

It is a further object of the present invention to provide a system which is able to effectively separate various types of vines ranging from those which are heavily or overly turgid, to those which have hooked stems, to those vines which are small and brittle.

Another object of the present invention is to provide an improvement in yield efficiency in rotary harvesting brush shakers, and to provide a system which can be an add-on system for increasing yield efficiency in existing rotary harvesting brush systems.

It is another object of the present invention to provide a harvesting system for shaking produce from its vines wherein the conveyor itself provides some resistance to relative movement of the vine masses upon the conveyor such that a more aggressive shaking and separation can be imparted to these vines by the tines of a rotating harvester shaking brush.

It is another object of the present invention to provide a harvesting system for shaking produce from its vines which is easy to construct and operate and is durable, requiring short and infrequent maintenance.

DISCLOSURE OF INVENTION

The apparatus for separating produce from a produce vine of the present invention is comprised, briefly, of a frame; a substantially cylindrical shaker brush assembly mounted to the frame for rotation about an axis of rotation. The shaker brush includes a plurality of spaced-apart tines extending radially outwardly from the axis of rotation to terminate in free ends, and the shaker brush is further adapted for vibration of the free ends of the tines during rotation of the shaker brush assembly. The produce separating apparatus further includes a conveyor assembly mounted for movement to the separator frame in the direction of rotation of the shaker brush along an arcuate path substantially concentric to the axis of rotation of the shaker brush at a radial distance therefrom positioning the free ends of the tines in close proximity to the conveyor assembly over the arcuate path. The conveyor assembly further is formed with a vine supporting structure comprised of a plurality of side-by-side, spaced-apart vine-support members, preferably rods, oriented transverse to the direction of advancement of the conveyor assembly. Finally, a drive assembly is coupled to drive the conveyor assembly, and in the most preferred form, is coupled for powered rotation of the shaker brush and powered vibration of the tines.

The method of separating produce of the present invention is comprised, briefly, of the steps of placing a produce vine in a shaker brush separator having a substantially cylindrical shaker brush assembly mounted for rotation and formed for simultaneous vibration of the free ends of the brush tines; and conveying the produce vine by a conveyor assembly in the direction of rotation of the shaker brush and along an arcuate path substantially concentric with an axis of rotation of the shaker brush assembly and closely proximate the free ends of the brush tines to maintain the produce vine in contact with the shaker brush over the length of the arcuate path.

BRIEF DESCRIPTION OF THE DRAWINGS

FIG. 1 is a top plan view of a produce vine separator comprising a rotating harvesting shaker brush and a conveyor belt assembly made in accordance with the present invention.

FIG. 2 is a side elevation view of the produce vine separator as shown in FIG. 1.

FIG. 3 is a top plan view of an alternative embodiment of a produce vine separator corresponding to FIG. 1 and further including a plurality of vertically oriented disks attached to a horizontal series of spaced-apart parallel rods.

FIG. 4 is a side elevation view of the produce vine separator as shown in FIG. 3.

FIG. 5 is an enlarged, fragmentary, top perspective view of a further alternative embodiment of the horizontal series of spaced-apart parallel rods of the present invention further including a plurality of finger members attached thereto and extending therefrom.

FIG. 6 is an enlarged, fragmentary, top perspective view of still a further embodiment of the horizontal series of spaced-apart parallel rods of the present invention further including a series of pipes.

FIG. 7 is an enlarged, fragmentary, top perspective view of still another embodiment of the horizontal series of spaced-apart parallel rods of the present invention further including a plurality of belts attached to the parallel rods.

FIG. 8 is a top plan view of another embodiment of the produce vine separator corresponding to FIG. 1 and further including a plurality of links attached between the parallel rods.

FIG. 9 is a side elevation view of the produce vine separator as shown in FIG. 8.

FIG. 10 is a top plan view of the produce vine separator as shown in FIG. 1 used in conjunction with a second rotating harvesting shaker brush.

FIG. 11 is a side elevation view of the produce vine separator as shown in FIG. 10.

BEST MODE OF CARRYING OUT THE INVENTION

The produce harvester of the present invention is a shaker brush type of separator constructed in a manner which significantly improves its efficiency in separating the produce from the produce vines and enables its use with a wider spectrum of produce. Improved separation efficiency is accomplished by maintaining the produce vine in contact with the oscillating shaker brush for a significantly longer period of time and by reducing the tendency for vines to become entangled and thereby trap the produce in the vine mass.

As best may be seen in FIGS. 1 and 2, a produce separator, generally designated 20, is shown which includes a shaker brush assembly, generally designated 21, and a conveyor assembly, generally designated 22. Separator assembly 20 will most commonly be incorporated into and form part of a field harvester, which are well known in the art and will not be described in detail herein. U.S. Pat. Nos. 4,335,570, 4,927,440 and 5,197,269, for example, show field harvesters which have shaker brush assemblies incorporated therein. As shown in FIG. 2, an incoming auxiliary conveyor 23 provided on the field harvester can convey cut or harvested produce bearing vines 24 to conveyor assembly 22 of separator 20.

As will be understood, however, produce separator 20 of the present invention also could be a stand-alone unit for use in the field or at a produce processing location remote from the field.

As is well known in the art, shaker brush assembly 21 is preferably provided by a generally horizontally oriented hub or central shaft 26 to which a plurality of radially extending brush tines 27 are secured. Brush hub or shaft 26 is rotatably mounted to a portion of the separator frame 28 (shown schematically in phantom in FIGS. 1 and 2 for clarity of illustration of the shaker brush and conveyor).

As will be seen from FIG. 1, tines 27 are transversely spaced from each other over the length of shaft 26 and are aligned so as to define spaces 29 between transversely adjacent ones of the tines. As best seen in FIG. 2, tines 27 terminate in free ends 31 which are all substantially the same distance from shaft 26 and axis of rotation 32 of the shaft such that brush assembly 21 has a substantially cylindrical shape.

The direction of rotation of shaker brush assembly 21 in the embodiment of FIGS. 1 and 2 is, as shown by arrow 33 in FIG. 2, and as also is well known in the art, shaker brush assembly 21 is formed for oscillation or vibratory motion (arrow 34) of tines 27 and their free ends 31. Vibration or oscillation of tine ends 31 preferably is accomplished by employing an eccentric weight assembly which imposes a vibratory motion on the shaker brush as it rotates. Such eccentric mechanisms for shaker brush separators are well known, and U.S. Pat. No. 4,335,570 contains a more detailed description of an assembly of this type which is suitable for use in the separator of the present invention. Such disclosure is incorporated herein by reference.

Shaker brush assembly 21 of the present invention, therefore, is constructed in a manner well known in the art and does not, by itself, comprise a novel portion of the present invention.

In order that vines 24 are maintained immersed in or fully contacted by shaker brush tines 27 for a longer period of time, separator 20 of the present invention includes a conveyor assembly 22 having an improved construction.

Conveyor assembly 22 is preferably formed as an endless belt-like structure which is mounted for movement to separator frame 28 in the same direction, as shown by arrows 36 in FIG. 2, as the direction of rotation of brush assembly 21. In the present invention, however, conveyor assembly 22 is mounted to frame 28 for movement along a substantially arcuate path, indicated by bracket 37, for example, by roller elements 38 which engage and rollingly support side chains, webs or belt-forming assembly 39 of the conveyor.

As will be seen from FIG. 2, arcuate path 37 is comprised of a plurality of segments which approximate an arc, and arc 37 is substantially concentric to axis of rotation 32 of shaker brush 21. Moreover, conveyor arcuate path 37 has a radius selected to position free ends 31 of tines 27 closely proximate the conveyor over the length of arcuate path 37. Most preferably, however, the radius of arcuate path 37 about axis 26 is slightly greater than the radial length of tines 27. As will be described below, this enables operation of brush 21 at a speed greater, less than or approximately equal to conveyor 22 without the tines hitting the vine support surface of the conveyor, which is particularly important when that surface is formed by longitudinally extending members rather than transversely extending members, which also will be discussed below.

As will be apparent from FIG. 2, the combination of a substantially cylindrical shaker brush 21 and a conveyor assembly 22 mounted for movement along an arcuate path 37, results in prolonged contact between vines 24 and shaker brush 21 as compared to shaker brushes which employ planar conveyors. The shaking action of brush 21, therefore, has a greater period of time during which it is applied to the vines and produce separation, therefore, is enhanced. Arcuate path 37 is preferably substantially symmetrical with respect to a vertical plane through axis of rotation 42, with arcuate path preferably extending over at least about 90 degrees and less than 180 degrees.

In addition to increasing the time of contact between the shaker brush and vines, separator assembly of the present invention is preferably constructed in a manner resisting the tendency of the vine matrix to bunch or become entangled to the point that separated produce cannot gravitate out of the vine matrix.

One structure which enhances vine separation is to form conveyor assembly 21 with a plurality of side-by-side, spaced-apart, vine-support members 41 which are secured to side chains or belts 39. Instead of being oriented parallel to the direction of advancement of conveyor 22, vine-support members 41 are oriented transverse to the direction of motion 36 of conveyor 22. More specifically, vine-support members preferably take the form of rods 41 which are oriented substantially parallel to each other and substantially parallel to axis of rotation 26 of the shaker brush. The rods are separated by a distance providing spaces 42 which are sufficient that the produce can fall or gravitate therethrough and yet the rods are sufficiently close together that vines will not be passed therethrough and will remain supported on the rods.

As the conveyor is advanced and the shaker brush oscillates or vibrates as shown by arrow 34, the transverse orientation of rods 41 tends to resist slippage between vines 24 and conveyor 22 in the directions of oscillation. Thus, a more vigorous shaking occurs and the resistance to slippage of the vines on the conveyor tends to open up the vine matrix, particularly if shaker brush 21 is driven at a speed faster than conveyor 22.

A final basic component of separator assembly 20, therefore, is drive assembly 43 (shown schematically in FIG. 2 in phantom lines). In separator 20, drive assembly 43 is coupled to drive conveyor assembly 22 in the direction of arrows 36, for example, by driving one or more of the conveyor's rotatable elements 38 (in this case element 38a). For produce crops, such as tomatoes, which have heavy or turgid vines, driving conveyor 22 will cause shaker brush to follow or be rotated and oscillated by engagement with the vines. This is a passive or unpowered shaker brush version, and again the longer contact and deeper immersion of tines 27 into vines 24 as a result of the arcuate conveyor path enhances the ability to use an unpowered shaker brush.

In the preferred form, however, drive assembly 43 is coupled to power or drive shaker brush 21, for example by coupling to shaft 26. As used herein, however, drive assembly 43 can be provided as a single assembly with two drive take-offs enabling driving of both the conveyor and the shaker brush, or it can be provided by a plurality of independent drive units.

In order to further encourage vine separation, it is preferable to drive shaker brush 21 by drive assembly 43 at an angular rate which causes free ends to travel at a speed which is greater than the speed of advancement of conveyor 22, as driven by drive assembly 43. This speed differential combines with the transverse orientation of rods 41 to tend to pull the vine matrix apart thus allowing separated produce to escape the matrix and fall between rods 41. Alternatively, shaker brush 21 can be driven by drive assembly 43 at an angular rate which causes free ends to travel at a speed which is less than the speed of advancement of conveyor 22, as driven by drive assembly 43. This speed differential combines with the transverse orientation of rods 41 to tend to push together or compact the vine matrix such that a sufficiently tight vine matrix is formed in the cases of small and brittle vines and in cases where the individual vines tend not to be well connected to adjacent vines, such that a more vigorous shaking can be imparted to this tight vine matrix. This arrangement of driving shaker brush 21 at an angular rate of speed causing its free ends to travel at a speed which is less than the speed of advancement of conveyor 22 in effect holds the vine in the envelope of shaker brush 21. This effect is very useful when harvesting small vines and/or in the cases of using too large a space between the rods of the conveyor for the crop being harvested. Accordingly, the speed of shaker brush 21 can be adjusted to be greater or less than that of the conveyor 22 depending upon the crop being harvested and the conditions of operation.

Keeping within the scope of the present invention, it is also possible to drive shaker brush 21 at an angular rate which causes free ends 31 to travel at a speed approximately equal to the speed of advancement of conveyor 22, in those instances when it is desirable neither to excessively pull apart the vine matrix nor to compact it together. Free ends 31 and conveyor 22 may also travel at an approximately equal speed in the case where the shaker brush is not powered in rotation.

As is conventional, separator 20 also will include produce collection surfaces or walls 44 beneath conveyor 21 which can direct separated produce to a collection receptacle (not shown) or a conveyor, such as cross-conveyor 46 which discharges to a collection receptacle. As will be seen from FIG. 2, collection surfaces 44 are relatively close to conveyor 21 so that the drop-distance of the produce is minimized. This also is the result of positioning conveyor 22 beneath shaker brush 21, most preferably with arcuate path 37 symmetrically positioned relative to a vertical plane through axis of rotation 32 of the shaker brush.

As shown in FIG. 2, conveyor 21 further includes a downwardly sloped intake section 47, which induces gravitation of vines and produce toward the arcuate path section 37. A discharge section 48 can be generally horizontally oriented or slightly upwardly or downwardly sloped.

In one embodiment, as is best seen in FIGS. 3 and 4, a plurality of vine-elevating members 50, more particularly being disc-shaped and rotatably connected to rods 41. In this embodiment, vine-elevating members 50 are connected to pipes 60 with transverse rods 41 being received into an internal bore 61 of these pipes 60. Alternately, and within the scope of the present invention, vine-elevating members 50 could be directly connected to rods 41 without the use of pipes 60. These vine-elevating members 50 operate such that at least a top end 51 of these vine-elevating members are positioned closer to axis of rotation 32 than the free ends 31 of the radially extending tines 27 are positioned to this axis of rotation 32. Accordingly, at least a portion of these vine-elevating members 50, (including top end 51), extends away from rods 41 and towards axis of rotation 32 to a position radially inwardly of free end 31 of tines 27.

As vines 24 pass over the top of these vine-elevating members 50, these vines will accordingly be lifted toward these tines, thus enabling these tines to more deeply penetrate the vine masses, aggressively pulling and spreading these vines 24 apart and increasing the chances of any given tine 27 coming into contact with produce on the vine, knocking this produce from its attached vine. In fact, the free ends 31 of tines 27 may actually protrude out from the bottom of the vine mass as it travels along the conveyor. This has the dual benefit of having the tines directly contacting more produce and more firmly shaking this produce from its vines.

Vine-elevating members 50 are also positioned on rods 41 or pipes 60 in a staggered bricklayed fashion as viewed from above, and as seen clearly in FIG. 3 such that they are positioned in spaces 29 between separate transversely adjacent tines 27. This allows tines 27 to pass deeply between vine-elevating members 50 without coming into contact with one another, especially when shaker brush assembly 21 and conveyor assembly 22 are traveling at different speeds.

It is to be understood that many other shapes of vine-elevating members other than merely disks can be attached to the rods 41 or pipes 60 to perform the same function keeping within the bounds of the present invention. The only criteria these vine-elevating members must have is that they must sufficiently raise the vines 24 while they pass through the tines 27 of shaker brush assembly 21, yet be spaced so as to pass through spaces 29 to not interfere with the rotational motion of these tines.

In another embodiment, as is seen viewing FIG. 5 in conjunction with FIGS. 1 and 2, a plurality of elongated fingers 70 are attached to the rods 41. Fingers 70 are designed to have upwardly extending top ends 71 which are positioned such that they extend radially inwardly toward axis of rotation 32 to a position radially inwardly of free end 31 of one of tines 27. As vines 24 pass along conveyor assembly 22, these fingers 70 operate to assist in grasping and holding the vine mass such that the conveyor assembly 22 itself is able to provide some resistance to vine 24 simply sliding freely across the top of the conveyor belt assembly 22 under the back and forth shaking effect of the brush tines 27. Rather, fingers 70 assist in holding vine 24 in a relatively stationary location with respect to the rods 41 of conveyor 11 while the shaker brush tines 27 pull apart the vine 24, thereby releasing a greater percentage of produce from its attached vines than could be achieved in prior art devices in which produce shaken free of its vines often still remained trapped in an entangled mass of vines. Similar to the case of vine-elevating members 50, fingers 70 are positioned between separate transversely adjacent tines 27, allowing these tines 27 and fingers 70 to simultaneously penetrate deeply into vines 24 from different directions so as to firmly hold, shake and spread apart these vines without the possibility of tines 27 and fingers 70 coming into contact, even when shaker brush assembly 21 and conveyor assembly 22 are moving at different speeds.

In another embodiment, as is best seen in FIG. 6, rods 41 can each be received into the center bore 61 of a tubular member or pipe 60. The purpose for these pipes are to increase the effective diameter of each of rods 41. The use of pipes 60 ensures that any vine being harvested by the system having a small hooked stem, such as many varieties of peppers which will not otherwise catch on the small diameter of the rods 41 as this would eventually cause blockage in the system. Pipes 60 also minimize the amount of dirt adhering to transverse rods 41. Furthermore, these pipes 60 are preferably rotatably mounted on each of rods 41. This offers the advantage of allowing clusters of fruit to fall through the conveyor if they affix themselves onto the rod. If these pipes could not otherwise rotate, these clusters of fruit would remain on top of the conveyor, eventually being lost as being discarded with their associated vine masses.

In another embodiment, as is seen viewing FIG. 7 in conjunction with FIGS. 1 and 2, a plurality of flexible supports 80 can be attached to rods 41 in a perpendicular direction to the rods, being aligned in the longitudinal direction of movement of conveyor assembly 22. The purpose of these flexible supports 80 is to ensure that when harvesting a plant with an extremely small or brittle vine, such as "second pick" peppers (which are the left-over result of an area being first harvested by hand), the amount of vine that inadvertently falls through the conveyor can be substantially reduced, as the vines of this "second-pick" harvest tend to be much shorter and have a significantly higher level of breakage. In addition, the flexible nature of these supports allows them to bend or stretch out of the way when the heavy pieces of produce pass down through spaces 42, but to generally remain in position when the lighter vines 24 are resting thereupon, thus generally preventing vines 24 from inadvertently passing through spaces 42.

In yet another embodiment, as is best seen in FIGS. 8 and 9, links 90 may be added to rods 41 to perform a function identical to that of vine-elevating members 50, shown in FIGS. 3 and 4. Accordingly, as these links 90 elevate vines 24 such that free ends 31 of tines 27 protrude deeply into the vines, and such that links 90 are positioned intermediate the transversely adjacent tines with links 90 running parallel to the direction of movement of conveyor assembly 22 and perpendicular to the direction of rods 41. Short sections of pipe or tubing 92 may be used so as to ensure a constant spacing between these parallel links 90.

The sections of tubing 92 may also be designed to be of a diameter sufficient to ensure that hooked stems do not attach to the rods 41 in the same manner that pipes 60 prevented this same problem, discussed above.

In another embodiment, as is seen in FIGS. 10 and 11, a second harvesting shaking brush assembly 100 can be used in series with harvesting shaker brush assembly 21. As shown, this shaker brush assembly 100 is an overhead-pass type, however, conceivably, an under-pass shaker brush assembly such as shaker brush assembly 21 could instead be used within the scope of the present invention. This shaker brush 100 operates to remove any produce not yet shaken free from its vines by separator 20. A cross conveyor 105 is also provided in this second shaker brush to remove any separated produce for collection. A final horizontal conveyor 110 is also provided for removal of the attached vines after their passing through separator 20 and over shaker brush 100.

Having set forth the apparatus of the present invention, the preferred method can now be set forth.

As best may be seen in FIGS. 1 and 2, a first method of separating produce from a produce vine comprises (a) placing a produce vine 24 having produce attached thereto into a shaker brush separator 20 having a substantially cylindrical shaker brush assembly 21 mounted for rotation in the direction of arrow 33 and for vibration in the direction of arrow 34. This rotation and vibration occurring simultaneously in shaker brush assembly 21 about axis of rotation 32. Vine 24 is conveyed by a conveyor assembly 22 in the direction of rotation of the shaker brush assembly 21 and along an arcuate path 37. This arcuate path 37 is substantially concentric with axis of rotation 32 of shaker brush assembly 21. This arcuate path 37 is also closely proximate free ends 31 of shaker brush assembly 21 thus maintaining the vine 24 in contact with the shaker brush assembly 21 over arcuate path 37.

This method of separating produce from a produce vine can also be accomplished wherein the conveying of the produce vine 24 is accomplished using a conveyor assembly 22 having a plurality of side-by-side vine support members 41 oriented substantially perpendicular to the direction of the conveying of vines 24 through the separator 20.

In addition, the conveying of vine 24 through separator 20 can be performed with shaker brush assembly 21 rotated at an angular rate of speed thus producing the speed at the free ends 31 of tines 27 of the shaker brush assembly 21 greater or less than the speed of the conveying of vine 24 along conveyor assembly 22. During this conveying of vine 24 through separator 20, the relative displacement between vine 24 and conveyor assembly 22 can be resisted by providing a plurality of radially protruding fingers 70 attached to vine support members 41. Furthermore, during the conveying of vine 24 through separator 20, vine 24 may be elevated toward the shaker brush assembly 21 by providing a plurality of radially protruding vine-elevating members (alternatively shown as disk-shaped members 50 or links 90), on vine support members 41.

What is claimed is:

1. An apparatus for separating produce from a produce vine comprising:
   a) a frame;
   b) a substantially cylindrical shaker brush assembly mounted to said frame for rotation about an axis of rotation, said shaker brush assembly having a plurality of spaced-apart tines extending radially outwardly from said axis of rotation and terminating in free ends, said shaker brush assembly further being formed for vibration of said free ends of said tines as said shaker brush assembly rotates;
   c) a conveyor assembly mounted for movement relative to said frame corresponding to a direction of rotation of said shaker brush assembly along a substantially arcuate path substantially concentric to said axis of rotation of said shaker brush assembly at a radial distance therefrom positioning said free ends of said tines in close proximity to said conveyor assembly along said arcuate path; and
   d) a drive assembly coupled to drive said conveyor assembly in said direction of movement.

2. The apparatus of claim 1 wherein,
said conveyor assembly further including a plurality of side-by-side vine-support members secured to said conveyor assembly in a transverse orientation relative to the direction of movement of said conveyor assembly, said vine-support members being spaced-apart from each other by an amount sufficient for passage of produce therebetween while supporting said produce vine thereon.

3. The apparatus of claim 1 wherein,
said drive assembly is coupled to rotate said shaker brush assembly in said direction of rotation and to produce vibration of said free ends of said tines.

4. The apparatus of claim 1 wherein,
said arcuate path is located at a radial distance slightly greater than a length dimension of said tines.

5. The apparatus of claim 1 wherein,
said axis of rotation of said shaker brush assembly is oriented in a substantially horizontal orientation; and
said conveyor assembly is positioned beneath said shaker brush assembly.

6. The apparatus of claim 5 wherein,
said conveyor assembly has an arcuate path extending over at least about 90 degrees.

7. The apparatus of claim 6 wherein,
said arcuate path is substantially symmetrical with respect to a vertical plane through said axis of rotation, and said arcuate path extends over less than about 180 degrees.

8. The apparatus of claim 7 wherein,
said conveyor assembly includes a downwardly sloping intake section in advance of said arcuate path and a discharge section after said arcuate path.

9. The apparatus of claim 2 wherein,
said vine-support members are provided by rods oriented substantially parallel to each other and substantially parallel to said axis of rotation of said shaker brush assembly.

10. The apparatus of claim 9 wherein,
said tines extend substantially perpendicularly to said axis of rotation of said shaker brush assembly.

11. The apparatus of claim 9, and
a plurality of vine-elevating members provided on said plurality of parallel rods, said vine-elevating members being positioned between transversely adjacent ones of said tines and extending from said rods toward said axis of rotation to positions radially inwardly of said free ends of said tines to lift said vines toward said tines.

12. The apparatus of claim 11 wherein,
said vine-elevating members are disk-shaped members oriented in planes perpendicular to said axis of rotation.

13. The apparatus of claim 12 wherein,
said disk-shaped members are rotatably mounted to said rods.

14. The apparatus of claim 9, and
a tubular member rotatably mounted on each of said rods.

15. The apparatus of claim 9, and
a plurality of elongated fingers attached to said plurality of parallel rods and extending radially inwardly toward said axis of rotation to resist relative movement between the vines and said rods.

16. The apparatus as defined in claim 15 wherein,
said fingers are attached to said rods at positions in between transversely adjacent ones of said tines, and said fingers extend toward said axis of rotation to positions radially inwardly of said free ends of said tines.

17. The apparatus of claim 9, and
a plurality of flexible supports attached to said plurality of spaced-apart parallel rods, said supports being oriented transversely to said rods.

18. The apparatus of claim 9, and
a plurality of parallel links connected between said plurality of spaced-apart parallel rods at positions intermediate transversely adjacent ones of said tines, said links running parallel to said direction of movement of said conveyor assembly.

19. The apparatus of claim 3 wherein,
the rate of rotation of said shaker brush assembly causes said free ends of said tines to move at a speed different from the speed of movement of said conveyor assembly.

20. The apparatus of claim 19 wherein, said speed of movement of said free ends of said tines is faster than the speed of movement of said conveyor assembly.

21. The apparatus of claim 19 wherein, said speed of movement of said free ends of said tines is slower than the speed of movement of said conveyor assembly.

22. The apparatus of claim 19 wherein, said speed of movement of said free ends of said tines is approximately equal to the speed of movement of said conveyor assembly.

23. A method of separating produce from a produce vine comprising the steps of:

a) placing a produce vine having produce attached thereto in a shaker brush separator having a substantially cylindrical shaker brush assembly mounted for rotation and formed for simultaneous vibration; and b) conveying said produce vine by a conveyor assembly in a direction corresponding to a direction of rotation of said shaker brush assembly and along an arcuate path substantially concentric with an axis of rotation of said shaker brush assembly proximate free ends of said shaker brush assembly to maintain said produce vine in contact with said shaker brush assembly over said arcuate path.

24. The method of claim 23 wherein, said step of conveying is accomplished using a conveyor assembly having a plurality of side-by-side vine-support members oriented substantially perpendicular to said direction of conveying said vines.

25. The method of claim 23 wherein, during said conveying step rotating said shaker brush assembly at an angular rate producing a speed of free ends of said shaker brush assembly greater than a speed of conveying said produce vine by said conveyor assembly.

26. The method of claim 23 wherein, during said conveying step rotating said shaker brush assembly at an angular rate producing a speed of free ends of said shaker brush assembly less than a speed of conveying said produce vine by said conveyor assembly.

27. The method of claim 24, and during said conveying step, the step of resisting relative displacement between said produce vine and said conveyor assembly.

28. The method of claim 27 wherein, said resisting step is accomplished by providing a plurality of radially protruding fingers on said vine-support members.

29. The method of claim 24, and during said conveying step, elevating said produce vine toward said shaker brush assembly.

30. The method of claim 29 wherein, said elevating step is accomplished by providing a plurality of radially protruding vine-elevating members on said vine-supporting members.

31. The method of claim 23 wherein, said conveying step is accomplished by conveying said produce vine underneath said shaker brush assembly over an arcuate path having a length between about 90 degrees and about 180 degrees.

* * * * *